INVENTOR.
Wayne A. Karlgaard
His Attorney

United States Patent Office 3,187,847
Patented June 8, 1965

3,187,847
SHOCK ABSORBER WITH DAMPENING FLUID
FLOW THROUGH PISTON ROD
Wayne A. Karlgaard, Englewood, Ohio, assignor to General Motors Corporation, Detroit, Mich., a corporation of Delaware
Filed Dec. 17, 1962, Ser. No. 245,214
4 Claims. (Cl. 188—88)

This invention relates to hydraulic shock absorbers and is particularly concerned with double direct acting type shock absorbers and to fluid flow control mechanisms therefor.

It is an object of the invention to provide a shock absorber wherein the intake and exhaust valves are incorporated in a structure utilizing a single duct which extends through the piston rod.

Another object of the invention is to provide valving for the shock absorber including intake and exhaust valves which are carried within the piston and concentrically located therewith and wherein the piston and piston rod are formed in a unitary structure which includes a single duct which connects the two pressure chambers through the valves.

Another object of the invention is to provide a double acting shock absorber which may be modified into a rebound cutoff type of shock absorber by the simple expedient of changing a rod guide and repositioning the orifice from the valving in the upper cylinder chamber.

Further objects and advantages fo the present invention will be apparent from the following description, reference being had to the accompanying drawings wherein preferred embodiments of the present invention are clearly shown.

Figure 1:
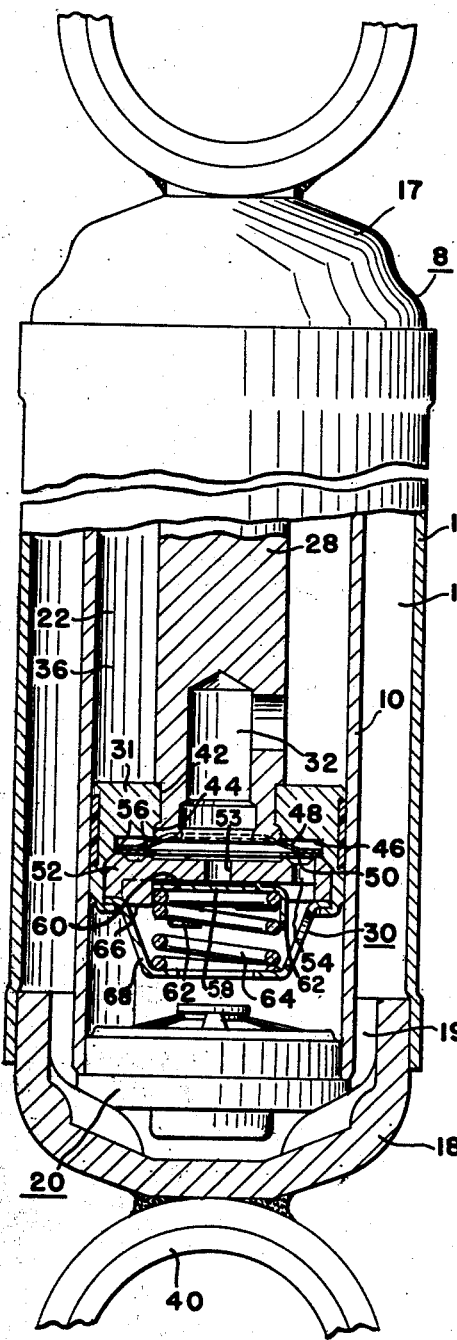
FIG. 1 is a partial sectional view of a double direct acting shock absorber in the compressed position.

Hydraulic shock absorbers of the double direct acting type are well known in the art. Numerous embodiments of these shock absorbers have been used with substantial success on motor cars and the like. Rebound cutoff shock absorbers have also been used, particularly in connection with the front shock absorbers, to eliminate the use of rubber bumpers, etc. These are for the most part similar to the double acting type with the exception that valving is provided which restricts the flow of fluid in the extended position of the shock absorber whereby slower action is obtained to damp the vehicle when the rebound is of high amplitude.

The present invention is directed to a shock absorber wherein consolidation of parts of the valving mechanism reduces the cost and improves the structure while making the shock absorber universal in its application whereby rebound cutoff types of shock absorbers may be made from standard double acting shock absorbers by the mere substitution of a rod guide and a change in the drilling of various hydraulic fluid ducts. Furthermore, due to the specific construction provided it is possible to hot up set the piston onto the piston rod to make a permanent connection therewith. This is possible since the usual valving carried by the piston adjacent the external skirt thereof has been eliminated and has been incorporated into a self contained valve structure, carried within the piston, and insertable after the hot upsetting operation has been completed.

It is understood that while the drawings show no stone shield or guard that such a guard may be used in connection with any of the shock absorbers shown herein as is well known in the art.

Since the specific improvements of the present shock absorbers are specifically directed to the valving mechanism and since this valving mechanism controls operation of the shock absorber in the same manner as previous shock absorbers of this type have been controlled no specific description of the theory of shock absorber action will be set forth here.

Specifically referring to the drawings, a shock absorber 8 is provided which includes a cylinder 10 that is enclosed by an outer tube 12 which forms an oil reservoir chamber 14 therearound. The reservoir chamber 14 is sealed at its upper end by means of a seal 16 held in place by a closure member 17. The lower end of the oil reservoir chamber 14 is sealed by a lower closure member 18 which includes a duct or ducts 19 therein. The inner cylinder 10 is sealed from the oil reservoir chamber 14 by means of a compression valve assembly 20 which includes suitable valving for controlling hydraulic fluid flow through the duct 19 from the chamber 14 into a chamber 22 within cylinder 10. The upper end of the chamber 22 is defined by a rod guide 24 which is sealed to the cylinder 10 and which acts as a seat for a spring 26 which compresses the seal 16. The seal 16 operates against a rod 28 which is guided by the rod guide 24. The rod 28 carries at its lower end a valve assembly 30 and is drilled centrally thereof as at 32 to form a duct which exhausts into the chamber 22 through the valve assembly 30 carried by a piston 31 attached to the lower end of the rod 28. The piston 31 is made of steel or other suitable material and may include a nylon piston ring 34 therearound which engages the inner surface of cylinder 10 in slidable relation thereto. The nylon piston ring 34 is made and applied in accordance with the teachings set forth in my copending application 829,595 filed July 27, 1959, which shows such a piston ring in connection with a conventional type of piston in a double acting shock absorber. The piston 31 and valve assembly 30 separate the chamber 22 into an upper chamber 36 and a lower chamber 38.

The shock absorber 8 is attached at one end by means of a fitting 40 to one part of the vehicle while the rod 28 is attached to the other part of the vehicle whereby the shock absorber acts between the sprung and unsprung mass of the vehicle in a conventional manner. As the shock absorber is activated due to relative movement between the sprung and unsprung masses, fluid is caused to flow from the lower chamber to the upper chamber or vice versa through the valve assembly 30 in accordance with the direction of movement of the several masses.

Specifically referring to the piston 31 and its attachment to the piston rod 28, it will be noted that the piston is fitted onto the undercut portion of the rod as at 42 and the rod is then hot upset as at 44 to permanently attach the piston thereto. The piston is undercut to form a centrally located cavity 46 therein into which the valve assembly 30 is fitted. This valve assembly 30 makes up a major part of the invention here and comprises a number of parts, specifically, an annular spring member 48, an annular valve disc 50, a centrally apertured valve plate 52 apertured centrally at 53 and which further includes a plurality of spaced apertures 54 around the periphery thereof which have a pair of annular seats 56 at opposite sides thereof that engage the valve disc and are normally closed thereby against fluid flow from the upper cylinder chamber. The surface opposed to the annular seats 56 on the apertured valve plate 52 is machine smooth and acts as a seating surface for a stamped valve cup 58. The valve cup 58 has an annular raised portion 60 therearound which seats against the surface of the valve plate 52 and seals the central aperture 53 thereof. The valve cup 58 includes three spaced fingers or ears 62 extending outwardly therefrom and away from the annular raised portion thereon. These fingers 62 act as a guide for a spring 64. The outer periphery of the fingers are guided with respect to the central aperture of the valve plate 52 by raised portions 66 preferably three in number and spaced equally around the valve plate 52 and between the spaced apertures 54 therethrough. These raised portions 66 guide the fingers 62 and the valve cup 58 and provide some friction against opening of the valve cup 58 against the spring. The entire assembly is held within the piston by an apertured cap 68 which is swedged into the piston after the assembled parts are positioned therein to permanently associate the several parts of the valve 30 and to provide a compressive force against the spring member 48 and the spring 64.

In operation, as the piston rod 28 is forced downwardly, fluid from the lower chamber 38 flows through the apertures 54 in the valve plate 52 and causes the annular valve disc 50 to open against the resistance of spring member 48 and permit fluid to pass through the apertures 54 into the duct 30 and thence into upper chamber 36. When the piston rod 28 is moving in the opposite direction on the rebound stroke the valve disc 50 is maintained closed and fluid passing into the duct 32 passes through aperture 53 to act against the top of the valve cup 58 which then acts to compress the spring 64 and moves the raised annular portion 60 downwardly from the bottom face of the valve plate 52 to thereby permit fluid to flow through the central aperture 53. Thus, operation of the shock absorber utilizes the two valve mechanisms which are maintained in concentric relation within the piston. Other portions of the shock absorber operate in a conventional manner.

Figure 2:
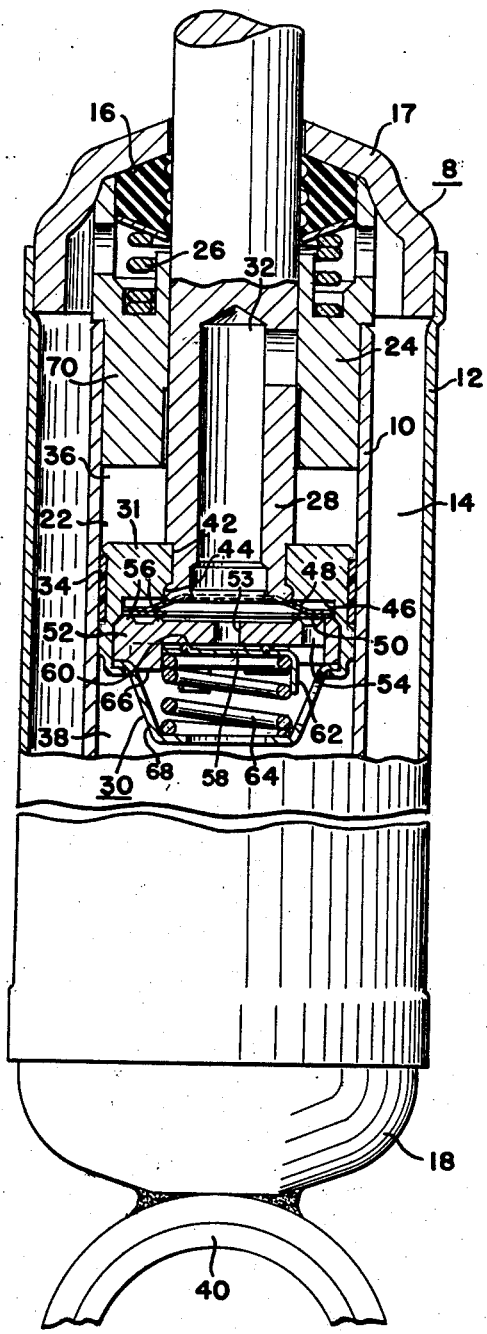
FIG. 2 is a view similar to FIG. 1 wherein the shock absorber has been modified into a rebound cutoff type wherein the shock absorber is in the extended position and the valving is rendered effective due to the cutoff effect of the rod guide.

When it is desired to modify the shock absorber into a rebound cutoff type, the bore 32 in the piston rod is extended (as noted in FIG. 2) and the rod guide 24 is elongated so that when the piston rod is in the position shown in FIG. 2 the opening from the valve assembly 30 is throttled or closed by the elongated rod guide 70. This slows the action of the shock absorber and prevents rapid rebound by cutting off the flow of fluid and permitting only a damped action within the shock absorber.

Thus, it will be seen that the present shock absorber design permits easy modification from a double direct acting shock absorber to a rebound cutoff type of shock absorber through slight modifications and without changing the valving mechanism in any way.

The present invention offers a simplified valve structure for the rebound and exhaust valves which reduce the cost of the structure because of consolidation of the parts within the simple valving mechanism while presenting a conventional type of shock absorber which is readily modified by a simple change of rod guide and modified counter bores in the piston rod to present rebound cutoff properties, if desired.

The structure of the valve assembly 30 provides quiet acting valves. It is believed that this quietness may be specifically attributed to the raised portions 66 on the valve plate 52 and the fingers 62 on the valve cup 58. In this connection the raised portions bind against the valve cup while the fingers bind against the spring to create friction which prevents rapid vibration which causes noise. This friction permits the valve to operate in its proper manner but damps any vibratory move due to the friction between the several parts. In this connection it should be pointed out that the apertured valve plate is preferably made from sintered porous metal which can be formed to rather accurate dimensions while the valve cup is a stamped member. In all cases the dimensions are not critical but are maintained within commercial tolerances and thus provided the desired friction to prevent vibratory excitation of the assembly.

While the embodiments of the present invention as herein disclosed, constitute preferred forms, it is to be understood that other forms might be adopted.

What is claimed is as follows:

1. In a direct double acting hydraulic shock absorber the combination of means forming a chamber, a piston including a passage therethrough and adapted to be reciprocated within said chamber for dividing said chamber into two variable capacity compartments, a piston rod having one end thereof connected to said piston, said piston rod having a concentric bore therein and a side opening therein communicating said concentric bore with one of said compartments, said concentric bore being in serial communication with said piston passage for hydraulically communicating said two compartments, said piston having an imperforate end wall surrounding said piston rod for directing all fluid flow across said piston through said serially communicated piston passageway concentric bore and side opening, a valve assembly carried by said piston including a valve plate having concentric valve seat faces on opposite sides thereof, a valve element concentrically aligned with each of said concentric valve seat faces, means for maintaining said valve elements normally closed against said valve seating faces, said last means being responsive to opposite movement of said piston within said chamber to affect a predetermined movement of said valve elements to control hydraulic flow through said serially communicated piston passage, piston rod bore and side opening between said variable capacity compartments.

2. The combination as claimed in claim 1 wherein said valve plate includes guides on one side thereof which engage the outer periphery of one of said valve elements for positioning it with respect to said plate.

3. The combination as claimed in claim 1 wherein one of said two valve elements is a spring pressed annular ring which seats against one of the valve seat faces on said valve plate and wherein the other of said valve elements is a cup-shaped valve which seats against the valve seat face on the opposite side of said valve plate.

4. The combination as claimed in claim 1 wherein one of said two valve elements is a spring pressed annular ring which seats against one of the valve seat faces on said valve plate and wherein the other of said valve elements is a cup-shaped member having a plurality of circumferentially spaced depending fingers and a bottom surface which engages the valve seat face on the opposite side of said valve plate, said valve plate having a plurality of circumferentially located guides on said opposite side thereof engaging the outer periphery of said cup-shaped valve, and means including a spring for holding the cup-shaped valve element against said valve plate, said spring frictionally engaging said depending fingers for damping high frequency vibrations within said shock absorber.

References Cited by the Examiner

UNITED STATES PATENTS

| 2,481,088 | 9/49 | Cuskie | 188—88 X |
|---|---|---|---|
| 2,538,375 | 1/51 | Montgomery | 188—88 |
| 2,702,099 | 2/55 | Lautz | 188—88 |

FOREIGN PATENTS

| 135,860 | 12/46 | Australia. |
|---|---|---|
| 65,160 | 9/55 | France. |
| 905,709 | 4/45 | France. |
| 934,671 | 11/55 | Germany. |

EUGENE G. BOTZ, *Primary Examiner.*

ARTHUR L. LA POINT, *Examiner.*